(12) United States Patent
Chen

(10) Patent No.: US 9,131,153 B2
(45) Date of Patent: Sep. 8, 2015

(54) REARVIEW PANORAMIC HEAD-UP DISPLAY DEVICE FOR VEHICLES

(71) Applicant: E-LEAD ELECTRONIC CO., LTD.

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 276 days.

(21) Appl. No.: 13/798,071

(22) Filed: Mar. 12, 2013

(65) Prior Publication Data

US 2014/0267585 A1 Sep. 18, 2014

(51) Int. Cl.
*H04N 7/00* (2011.01)
*H04N 5/232* (2006.01)
*G02B 27/01* (2006.01)

(52) U.S. Cl.
CPC ............ *H04N 5/23238* (2013.01); *G02B 27/01* (2013.01); *B60R 2300/205* (2013.01); *B60R 2300/303* (2013.01); *B60R 2300/60* (2013.01); *B60R 2300/8066* (2013.01); *G02B 2027/014* (2013.01); *G02B 2027/0118* (2013.01); *G02B 2027/0123* (2013.01); *G02B 2027/0138* (2013.01)

(58) Field of Classification Search
CPC ......................... H04N 5/23238; H04N 5/2628
USPC ........................................ 348/36, 37, 38, 39
See application file for complete search history.

(56) References Cited

U.S. PATENT DOCUMENTS

| | | | |
|---|---|---|---|
| 5,005,009 A * | 4/1991 | Roberts .............................. | 345/7 |
| 5,646,614 A * | 7/1997 | Abersfelder et al. ......... | 348/118 |
| 6,421,081 B1 * | 7/2002 | Markus .......................... | 348/148 |
| 6,785,404 B1 * | 8/2004 | Shimazaki et al. ........... | 348/113 |
| 7,612,798 B2 * | 11/2009 | Kinugasa et al. ............. | 348/148 |
| 8,218,007 B2 * | 7/2012 | Lee et al. ....................... | 348/148 |
| 8,618,955 B2 * | 12/2013 | Baker ............................ | 348/143 |
| 8,830,317 B2 * | 9/2014 | Meier ............................ | 348/143 |
| 2003/0122930 A1 * | 7/2003 | Schofield et al. ............. | 348/148 |
| 2003/0160736 A1 * | 8/2003 | Faso et al. ........................... | 345/8 |
| 2005/0192725 A1 * | 9/2005 | Li ................................... | 348/148 |
| 2006/0103590 A1 * | 5/2006 | Divon ................................ | 345/7 |
| 2006/0215020 A1 * | 9/2006 | Mori et al. ..................... | 348/119 |
| 2007/0112444 A1 * | 5/2007 | Alberth et al. .................. | 700/32 |
| 2013/0250046 A1 * | 9/2013 | Schofield et al. ............... | 348/36 |

FOREIGN PATENT DOCUMENTS

JP 2003127707 A * 5/2003

* cited by examiner

*Primary Examiner* — Jay Patel
*Assistant Examiner* — Francis G Geroleo
(74) *Attorney, Agent, or Firm* — Guice Patents PLLC

(57) ABSTRACT

A rearview panoramic head-up display device for vehicles, which includes a camera lens input port group, a base, a display module, a detection module and a semitransparent reflective film. The camera lens set on each side outside the car are used to capture the image around the car and transmit the images to the present device inside the car. A three-dimensional rear panoramic image is formed by synthesizing the images by a panoramic display processor in the present device and projected on the windshield of the car by the display module, so that the driver may observe the real-time condition in rear, left rear and right rear of the car while looking ahead, the driver may know the condition around the car without moving the line of sight through a large angle, to thereby improve traffic safety.

9 Claims, 8 Drawing Sheets

REARVIEW PANORAMIC HEAD-UP DISPLAY DEVICE FOR VEHICLES

BACKGROUND OF THE INVENTION

1. Field of the Invention

A rearview panoramic head-up display device for vehicles and, more particularly, to the rearview panoramic head-up display device for synthesizing a three-dimensional rearview image, to know the view image around the car without moving the line of sight through a large angle, to thereby improve traffic safety.

2. Brief Description of the Related Art

The driver may pay attention on the condition in front of the car anytime, and may also pay attention on the rear car. Therefore, an in-car rearview mirror is set above the windshield in the car for reflecting the rear image. However, the visual range of the rearview mirror is small, a left rearview mirror and a right rearview mirror are set on the front outside of the left and right front doors of the car respectively. The driver may use the three reflection mirrors to observe the image in rear of the car.

Since the distance between the in-car rearview mirror and the left and right rearview mirrors is so far that the driver cannot give consideration to the three mirrors within the forward aspect angle, the driver should timely raise his head to check the in-car rearview mirror in the interval of looking at the road in front of the car, check the left rearview mirror when turning left, and check the right rearview mirror when turning right. This kind of moving line of sight frequently may easily make the driver tired, and the driver is also difficult to perform the real rearview action usually. Moreover, there are blind spots of line of sight when using the two left and right rearview mirrors, thus the suggestion of traffic safety dogma is that the driver may turn his head to check the condition in rear of the car directly when turning or changing lanes, the driver cannot rely on the rearview mirrors completely. This makes driving harder that the traffic accidents happened frequently.

In order to solve the problem of the above blind spot of line of sight, the head-up display used in the aircraft is employed by the industries as a driving auxiliary equipment. Originally, pilots may conveniently obtain desired messages by using this kind of head-up display, which directly project messages in front of the cockpit to avoid pilots lowering head to check the messages on the instrument board, that pilots can easily combine the messages displayed by the head-up display with the outside scene. Since the image reflected into eyes and the central axis of the aircraft is balanced, the height of pilots may not cause error on pitch angles or visual aim. Therefore, the purpose of the head-up display is that pilots may always keep the head-up posture without lowering head to check the messages displayed on the instrument board, to reduce ignoring the rapid change in the external environment during the interval between lowering head and heading-up, and avoid the delay and discomfort due to eyes focal length is adjusted continuously. Thus, using this kind of head-up display to the vehicles may reduce the drivers' eyes load.

Otherwise, it is one of the biggest main reasons of car accidents that drivers' line of sight is away from the front road when driving. In order to reduce the frequency and duration that drivers' line of sight away from the front road, some car manufacturers equip this kind of head-up display inside the luxury cars, thus, the drivers know the information, such as car speed and engine speed, without moving line of sight away from the front windshield, to maintain traffic safety.

In general driving condition, the shortest time of moving the line of sight away from the front road for reading the information displayed on the instrument board is 0.5 second. For the condition of highway speed of 100 km per hour, the car travels 30 meters per second, and the risk is increased when there are a lot of cars on the road. For safety, the car manufacturers may equip the head-up display in some cars to reduce the distraction of drivers, and the head-up display is used as marking practices to attract consumers.

Recently, the technique of the head-up displays used in the cars is less complicated than the head-up displays equipped in aircrafts. It is one kind of optical system, and generally it is consisted of two main equipments, which are a projector and a combiner. The projector is consisted of signal light sources, projection lens and other optical components. The signal light source of the projector is consisted of LCD monitors or CRT equipments. Light is emitted from the signal light source and projected to the combiner on the glass (or a special transparent screen) by the projector, and the combiner displays words or images.

In the recent years, there are many head-up displays for installation in car in the market. These head-up displays may simply display car speed and engine speed, now display water temperature, throttle position, fuel, over-speed warning, reverse image, battery voltage, and even combine the speed radar. Some products are stressed as quick installation, which are just connected to the car PC without using other cables. In the luxury cars of some car manufacturers, the information of the navigation system, front and rear vehicle distance is added into the information displayed by the head-up display, which is increased a lot of convenience for drivers. Besides, the external head-up displays in the market is various, and the prices are from several hundred dollars for simple function ones, to ten thousand dollars for good quality and versatile ones.

As above, the technique of the head-up displays has been widely used in the vehicles. The related patent references are numerous, the typical representative such as TW M425068 (called cited reference 1, as shown in FIG. 1), TW 1305757 (called cited reference 2, as shown in FIG. 2). Wherein, in the cited reference 1, which includes: at least an image capture unit 10, which is used to monitor the driving dynamics outside the car and generate at least a dynamic image; a head-up display unit 20, which includes an image projection module 21 for projecting images, and an image reflection module 22 covered on a front windshield of the car. The image reflection module 22 is used to reflect the light and shade, by the auxiliary of the light and shade, the driving dynamics may be monitored. The cited reference 1 has disclosed that multiple photography devices 11, 12, 13, 14 are used to shot the image outside the car and output the shot images to the head-up display unit 20. Although the cited reference 1 may capture images from many directions, the head-up display unit 20 may only displayed one of the shot images according to the driving conditions. For example, when the right direction indicator is started, a right side (or right rear) image is switched to be displayed through a switch circuit 15, this kind of single (or single side) image cannot really provides the panoramic image around the car to the driver timely, so there are still dead angles of drivers' line of sight.

In the cited reference 2 installed on a car, includes: a CMOS image capture device 31, which is installed in a specific position on a rear section of the car and used to capture a rear image for performing image processing to thereby output a corresponding image signal; at least a high-brightness LED 32, which is installed in a specific position on the rear section of the car near the bumper; a display unit 33, which is set inside the car; a controller 34, which is electrically connected to the CMOS image capture device 31, the at least a high-brightness LED 32 and the display unit 33, wherein the controller 34 is used to control the at least a high-brightness LED 32 to emit light, control the CMOS image capture device 31 to capture the rear image for performing image processing, and control the display unit 33 to display the rear image; and a starting device 30, which is electrically connected to the controller 34 and is used to output a starting signal to the controller 34, the controller retrieves the starting signal to control the at least a high-brightness LED 32 to emit light; the starting device 30 is consisted of any one of the following groups: (a) a reverse speed change device 35, and the starting signal is a reverse gear signal output by the reverse speed change device; (b) a photosensitive switch 36, and the starting signal is a low light signal output by the photosensitive switch; and (c) an electronic clock 37, and the starting signal is an alarm signal output by the electronic clock 37, which has disclosed that the photography lens is used to shot the rear image, and a high-brightness LED 32 is used to fill light to the image. The cited reference 2 could only provide the rear image, and for the dead angles of line of sight in the right side and the left side of the car, the driver still need to turn his head to see the left and right rearview mirrors for overcoming the dead angles of line of sight.

SUMMARY OF THE INVENTION

In view of the drawbacks of the conventional ones, the inventor finally completed the rearview panoramic head-up display device for vehicles of the present invention after numerous improvements, namely, the object of the present invention is to provide a rearview panoramic head-up display device for synthesizing a three-dimensional rearview image.

The rearview panoramic head-up display device for vehicles of the present invention, which includes a camera lens input port group, a base, a display module, a detection module and a semitransparent reflective film.

The camera lens input port group, wherein at least three camera lens input ports are set for connecting to three camera lens respectively located on the rear, left and right sides of the car, to capture the images of surroundings in rear of the car.

The base, wherein a capacity space is set inside for placing a circuit board, the circuit board includes a panoramic display processor, the circuit board is electrically connected to the camera lens input port group, the panoramic display processor is used to join the images shot by the at least three camera lens together by using image processing techniques to form a three-dimensional panoramic image, and a display opening is set on the surface of the base.

The display module, which is electrically connected to the circuit board, and is set on the display opening to receive the images output from the circuit board to display the images as a mirror image.

The detection module, which is a light sensing unit, is electrically connected to the circuit board and is used to sense the brightness of the environment to modulate the brightness of the display module.

The semitransparent reflective film, is pasted on the inner side of the front windshield of the car to display the image of the display module as mirror images.

The above base, is placed on the instrument desk of the car, or embedded into the instrument desk under the front windshield.

The above display module, whose brightness achieved at least 2500 nit.

The rearview panoramic head-up display device for vehicles, which further includes a satellite module, the satellite module is electrically connected to the circuit board, the satellite module includes a satellite position information, the camera lens is modulated as a lateral far angle when turning in an intersection.

The rearview panoramic head-up display device for vehicles could further modulate the visual angle of the camera lens according to the car speed, the detection module is a car speed detection unit, which is electrically connected to the circuit board, is used to modulate the visual angle of the camera lens, the visual angle of the camera lens is modulated to a rear far angle when the car speed is higher than a set car speed, the visual angle of the camera lens is modulated to a downwards angle of visibility when the car speed is lower than the set car speed.

The above set car speed, is 20 km/hr.

The above camera lens input port group, which further includes a front camera lens input port, which is used to connect to a front camera lens to capture the image in front of the car.

The rearview panoramic head-up display device for vehicles of the present invention, could further modulate the visual angle of the camera lens according to the detected reverse signal and the signal indicating whether there is a moving car in rear of the car or not, the detection module includes a reverse signal unit and an image identification unit and is electrically connected to the circuit board, when the reverse signal unit detects a reverse signal and the image identification unit detects that there is a moving car in rear of the car, the visual angle of the camera lens is modulated to a rear far angle; and when the reverse signal unit detects a reverse signal and the image identification unit detects that there is no moving car in rear of the car, the visual angle of the camera lens is modulated to a downwards angle of visibility.

The rearview panoramic head-up display for vehicles of the present invention, which use the camera lens set on each side outside the car to capture the image around the car, and transmit the images to the present device inside the car. A three-dimensional rear panoramic image is formed by synthesizing the images by a panoramic display processor in the present device, and projected the three-dimensional rear panoramic image on the windshield of the car by the display module, so that the driver may observe the real-time condition in rear, left rear and right rear of the car while looking ahead, the driver may know the condition around the car without moving the line of sight through a large angle, to thereby improve traffic safety.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
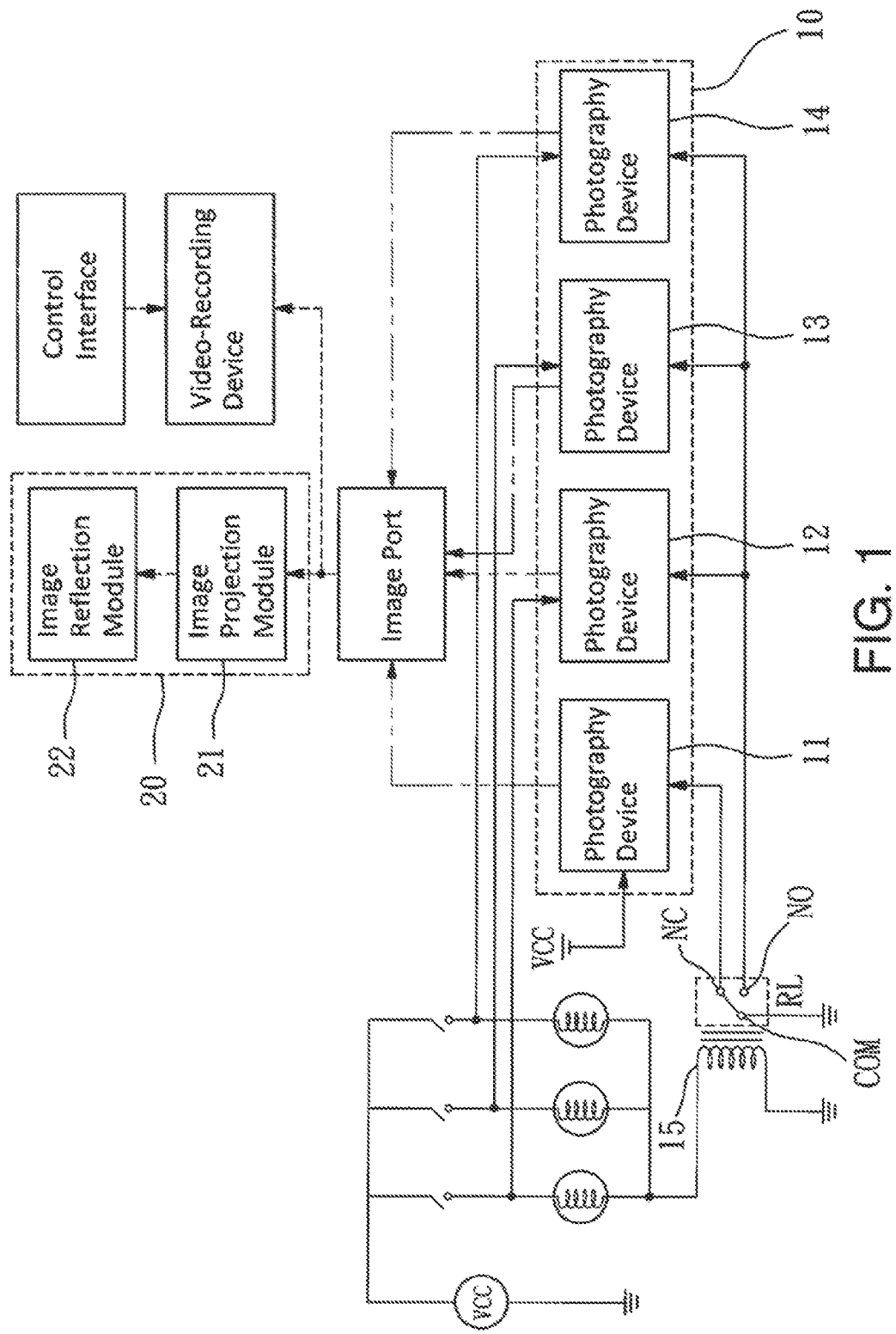
FIG. 1 is a function block diagram of the cited reference 1.
Figure 2:
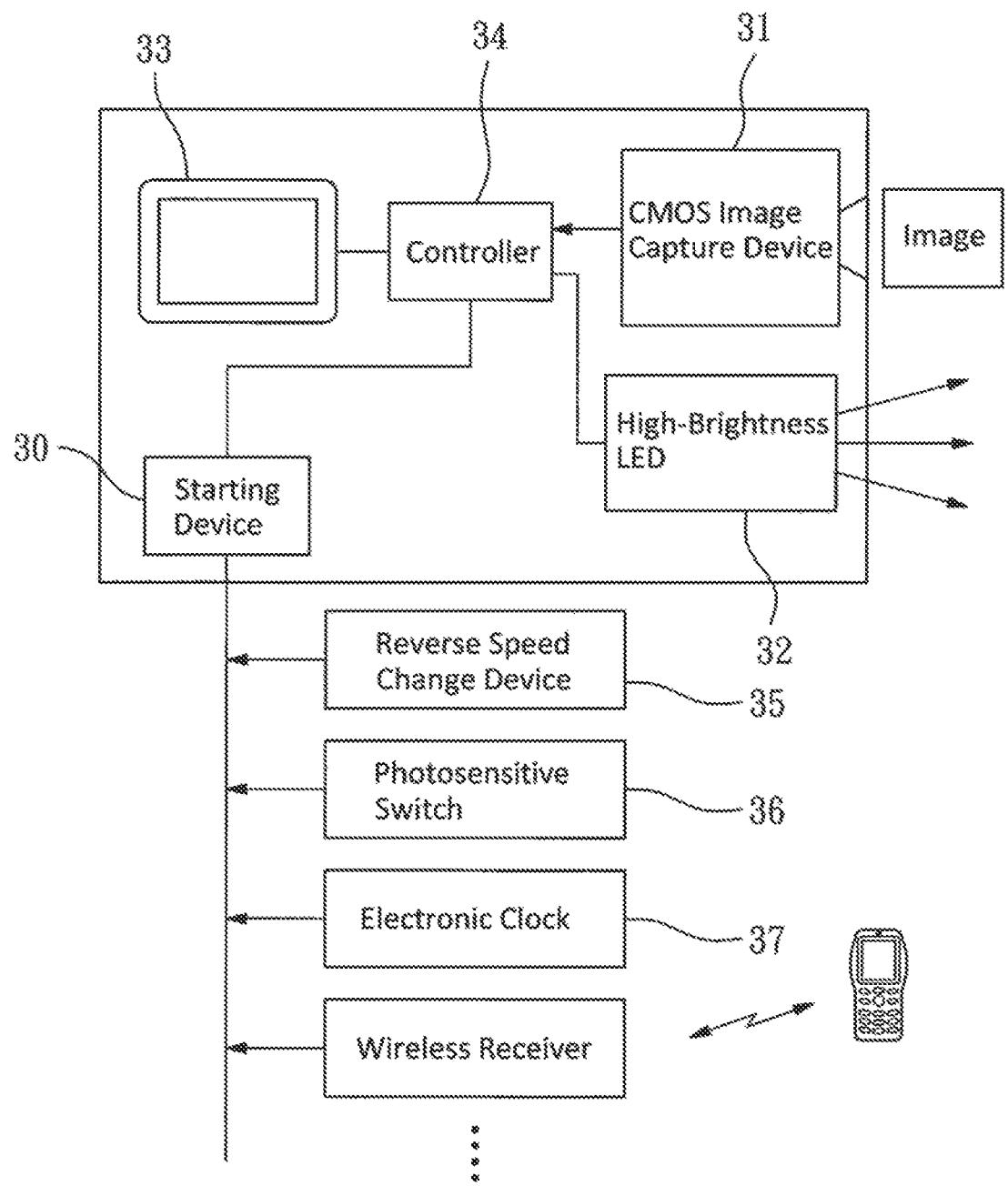
FIG. 2 is a function block diagram of the cited reference 2.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 3:
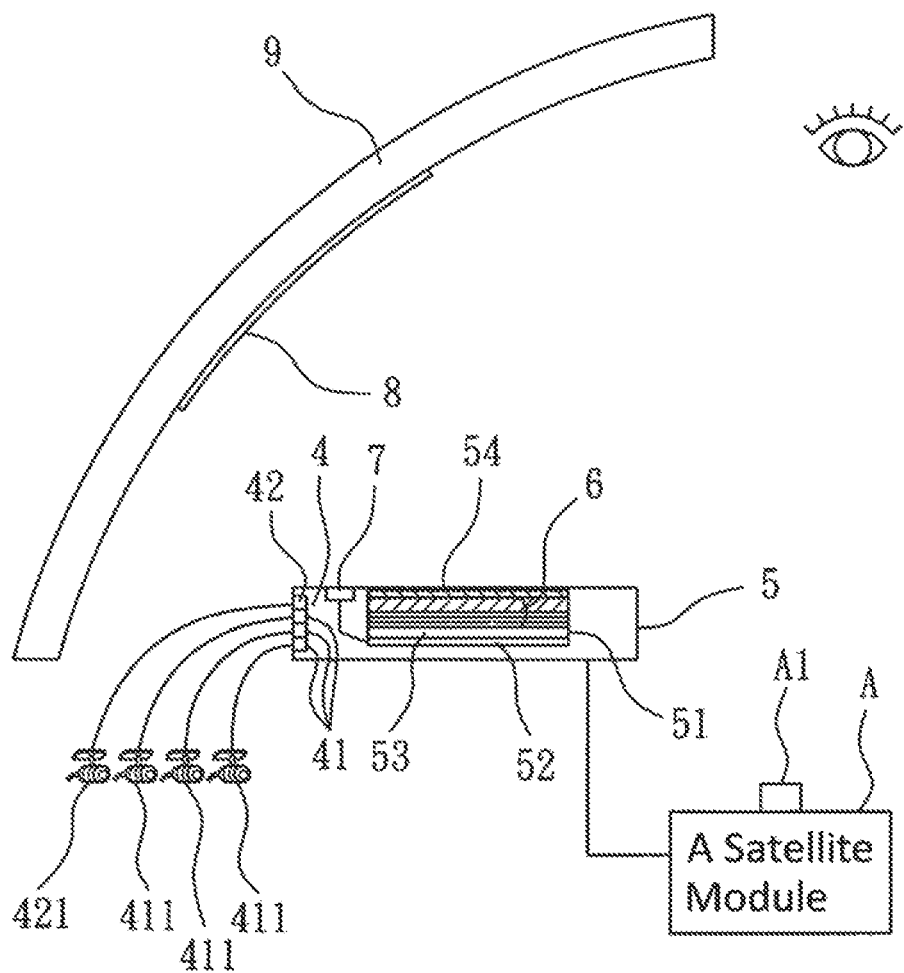
FIG. 3 is a structural diagram according to the present invention.
Figure 4:
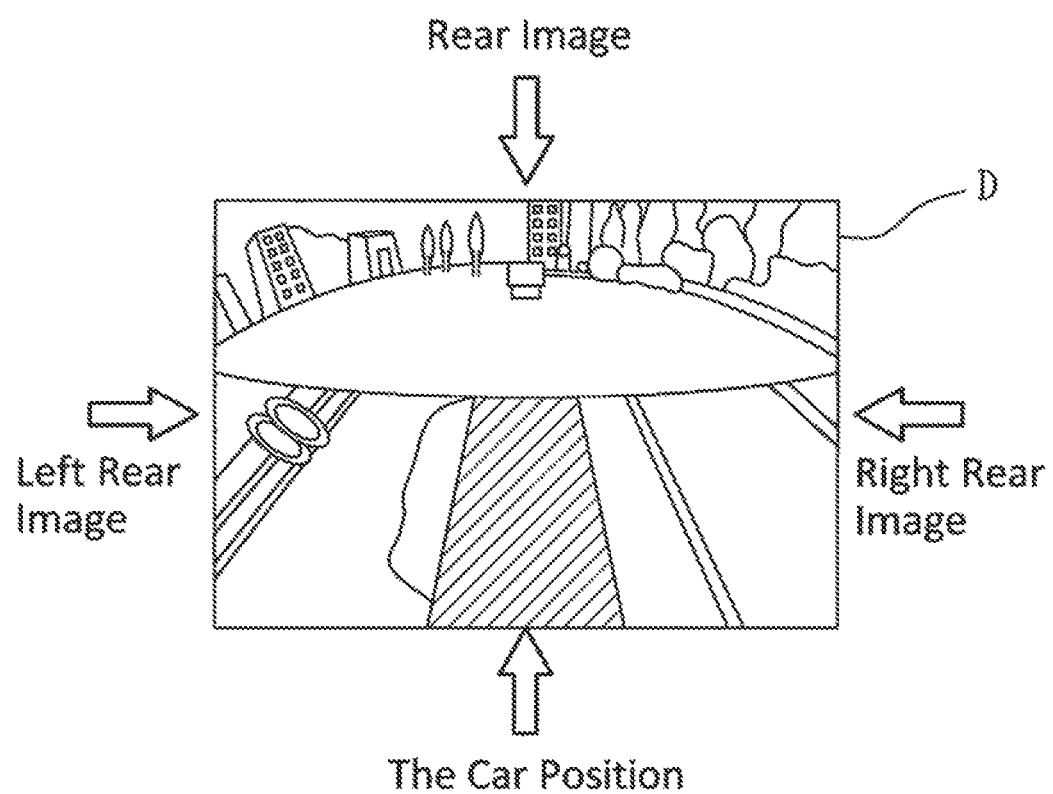
FIG. 4 is a panoramic image diagram of the rear far angle according to the present invention.

Please refer to FIG. 3 and FIG. 4, the first embodiment of the rearview panoramic head-up display device for vehicles of the present invention, includes:

a camera lens input port group 4, wherein at least three camera lens input ports 41 are set for connecting to three camera lens 411 respectively located on the rear, left and right sides of the car, to capture the images of surroundings in rear of the car;

a base 5, wherein a capacity space 51 is set inside for placing a circuit board 52, the circuit board 52 includes a panoramic display processor 53, the circuit board 52 is electrically connected to the camera lens input port group 4, the panoramic display processor 53 is used to join the images shot by the at least three camera lens together by using image processing techniques to form a three-dimensional panoramic image D, and a display opening 54 is set on the surface of the base 5;

a display module 6, which is electrically connected to the circuit board 52, and is set on the display opening 54 to receive the images output from the circuit board 52 to display the images as a mirror image;

a detection module 7, which is a light sensing unit, is electrically connected to the circuit board 52 and is used to sense the brightness of the environment to modulate the brightness of the display module 6; and a semitransparent reflective film 8, which is pasted on the inner side of the front windshield 9 of the car to display the image of the display module 6 as mirror images.

By the composition of the above elements, the present device captures the image of surroundings in rear of the car by using the three camera lens 411 set in rear, left and right side of the car; and the captured images are transmitted to the panoramic display processor 53 of the circuit board 52 by the camera lens input port group 4. After a three-dimensional panoramic image D is formed by joining the images shot by the at least three camera lens together by the panoramic display processor 53, the display module 6 reflects the image on the semitransparent reflective film 8 by mirror image display method, the detection module 7 (which is a light sensing unit) detects the brightness of the environment simultaneously to modulate the brightness of the display module 6 correspondingly to thereby provide a clear image for drivers.

The above base 5, is placed on the instrument desk of the car, or embedded into the instrument desk under the front windshield 9.

The above display module 6, whose brightness achieved at least 2500 nit.

The above camera lens input port group 4, which further includes a front camera lens input port 42, which is used to connect to a front camera lens 421 to capture the image in front of the car.

Figure 5:
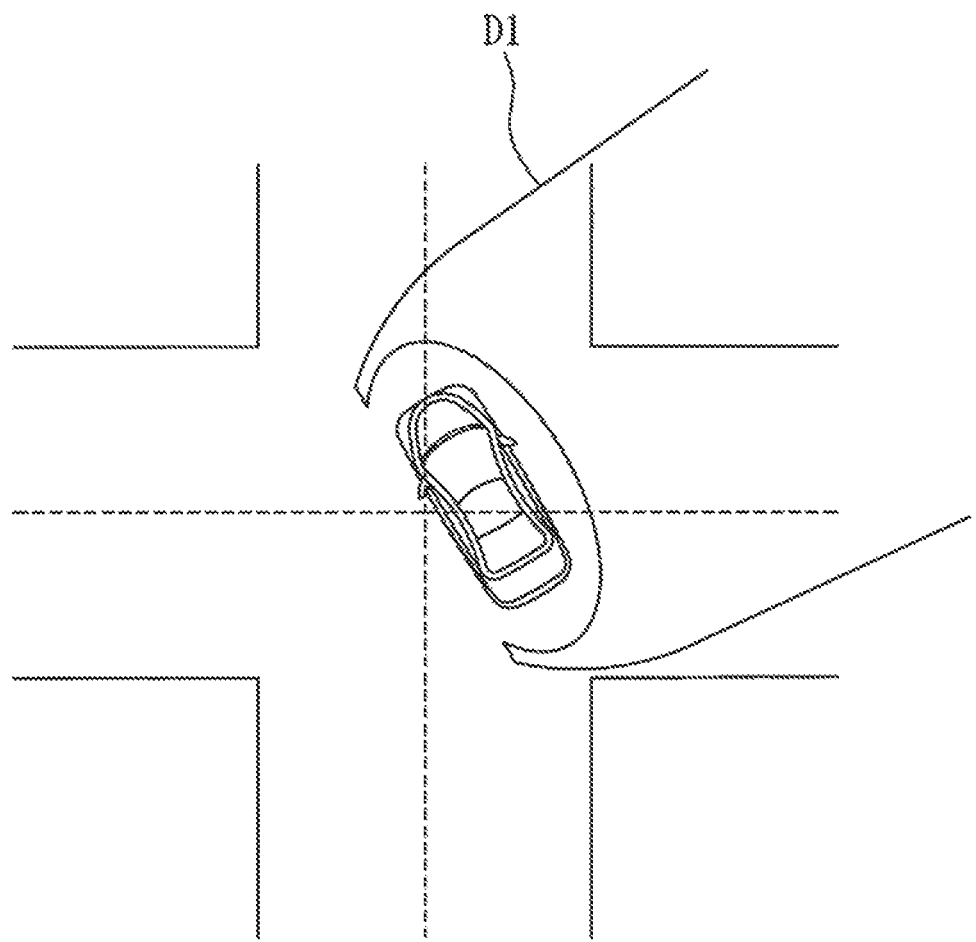
FIG. 5 is a distribution diagram of the range of line of sight of the lateral far angle according to the present invention.

The above first embodiment of the present invention further includes a satellite module A, which is electrically connected to the circuit board 52, the satellite module A includes a satellite position information, the visual angle of the camera lens 411 and the front camera lens 421 is modulated as a lateral far angle when turning in an intersection (as shown in the visual range D1 illustrated in FIG. 5).

Figure 7:
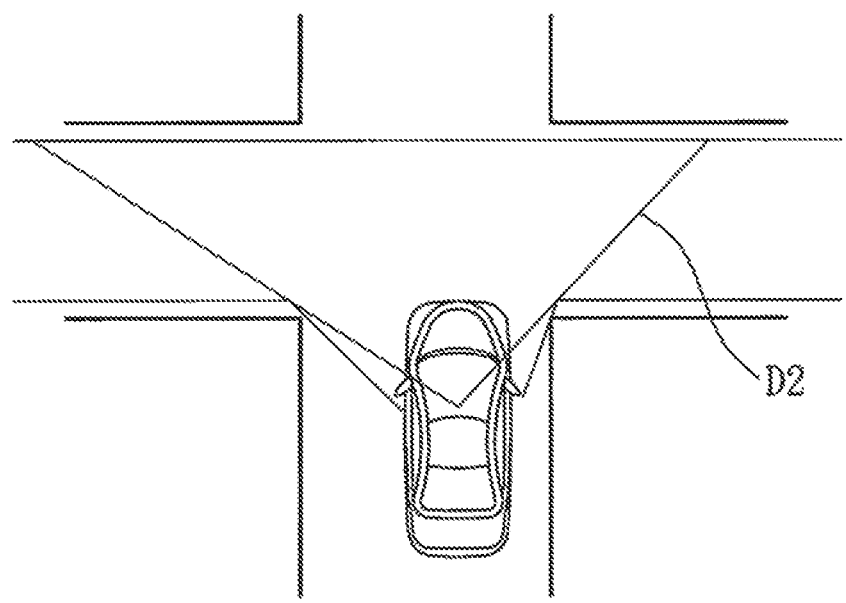
FIG. 7 is a distribution diagram of the range of line of sight of the left side angle and right side angle according to the present invention.
Figure 8:
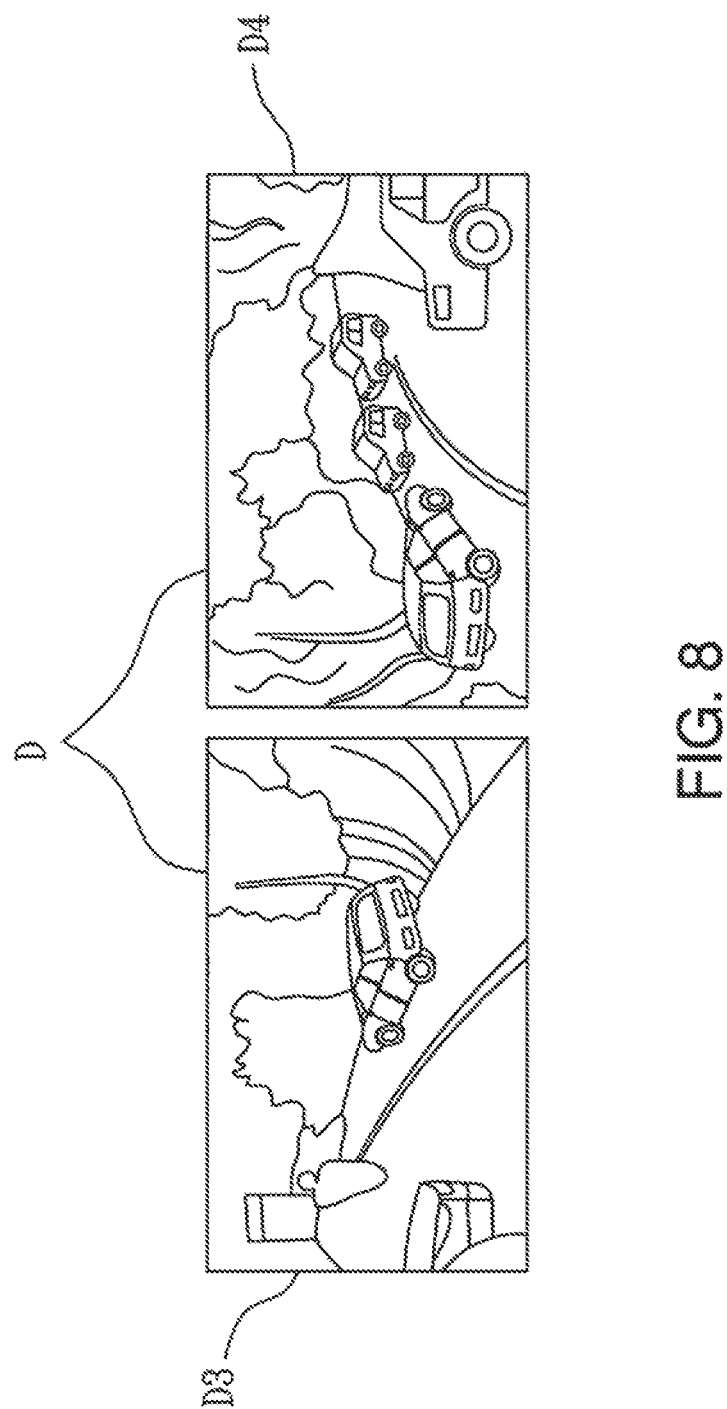
FIG. 8 is a panoramic image schematic diagram of left side angle and right side angle of visibility according to the present invention.

The above first embodiment of the present invention, wherein the satellite module A further includes a control button A1, which is provided to press for modulating the visual angle of the camera lens 411, and the satellite positioning and map data is provided to store the modulated visual angle of the camera lens, location and the vehicle traveling direction. In the future, when the car passes through the location in the same direction, the visual angle is switched automatically. For example, when passing an intersection without signals, the user presses the control button A1 first, and the visual angle of the camera lens 411 is modulated to left and right side angle (as the distribution of the range of line of sight D2 schematically shown in FIG. 7). The image of the display module 3 shows the coming cars from both sides of the intersection (as shown in FIG. 8, the wide-angle panoramic image D shows a left side image D3 and a right side image D4 simultaneously). Since the satellite positioning and map data stores the location and the vehicle traveling direction, the visual angle of the camera lens 411 may be modulated automatically when the car passes this place next time.

Figure 6:
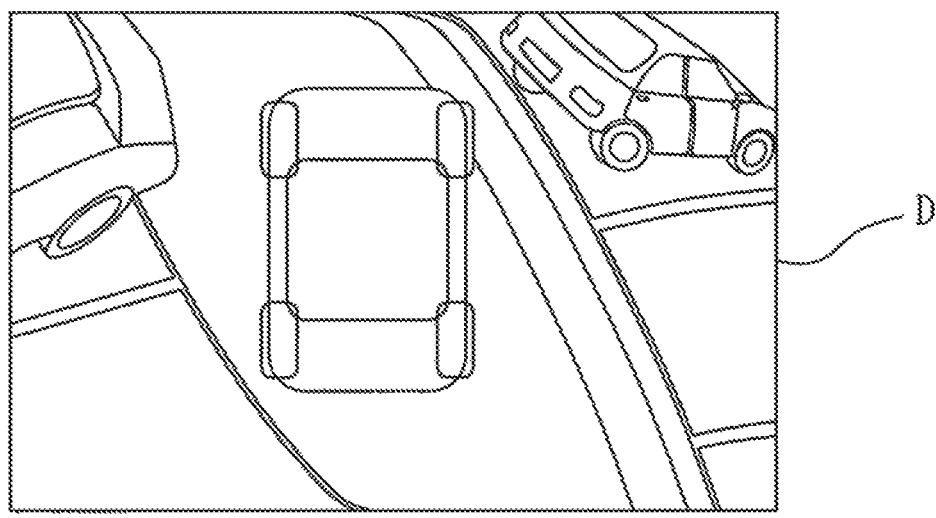
FIG. 6 is a panoramic image diagram of downwards angle of visibility according to the present invention.

As shown in FIG. 3, FIG. 4 and FIG. 6, the second embodiment of the rearview panoramic head-up display device for vehicles of the present invention, which may modulate the visual angle of the camera lens 411 according to the car speed, which includes: a camera lens input port group 4, wherein at least three camera lens input ports 41 are set for connecting to three camera lens 411 respectively located on the rear, left and right sides of the car, to capture the images of surroundings in rear of the car;

a base 5, wherein a capacity space 51 is set inside for placing a circuit board 52, the circuit board 52 includes a panoramic display processor 53, the circuit board 52 is electrically connected to the camera lens input port group 4, the panoramic display processor 53 is used to join the images shot by the at least three camera lens together by using image processing techniques to form a three-dimensional panoramic image D, and a display opening 54 is set on the surface of the base 5;

a display module 6, which is electrically connected to the circuit board 52, and is set on the display opening 54 to receive the images output from the circuit board 52 to display the images as a mirror image;

a detection module 7, which is a car speed detection unit, is electrically connected to the circuit board 52 and is used to modulate the visual angle of the camera lens 411, the visual angle of the camera lens 411 is modulated to a rear far angle when the car speed is higher than a set car speed, the visual angle of the camera lens 411 is modulated to a downwards angle of visibility when the car speed is lower than the set car speed;

a semitransparent reflective film 8, which is pasted on the inner side of the front windshield 9 of the car to display the image of the display module 6 as mirror images.

By the composition of the above elements, the present device captures the image of surroundings in rear of the car by using the three camera lens 411 set in rear, left and right side of the car; and the captured images are transmitted to the panoramic display processor 53 of the circuit board 52 by the camera lens input port group 4. After a three-dimensional panoramic image D is formed by joining the images shot by the at least three camera lens together by the panoramic display processor 53, the display module 6 reflects the image on the semitransparent reflective film 8 by mirror image display method, the detection module 7 (which is a car speed detection unit) detects the car speed to modulate the visual angle of the camera lens 411, namely, when the car speed is higher than a set car speed (it is usually in a high speed driving condition, and the driver needs wider visual vision), the visual angle of the camera lens 411 is modulated to a rear far angle (as shown in FIG. 4, the panoramic image D is a displayed image of a rear far angle); and when the car speed is lower than the set car speed (it is usually in a low speed driving condition, and the driver needs close sight), the visual angle of the camera lens 411 is modulated to a downwards angle of visibility (as shown in FIG. 6, the panoramic image D is a displayed image of a downwards angle of visibility).

The above base 5, is placed on the instrument desk of the car, or embedded into the instrument desk under the front windshield 9.

The above set car speed is 20 km/hr.

The above display module 6, whose brightness achieved at least 2500 nit.

The above detection module 7, which further includes a light sensing unit, is electrically connected to the circuit board 52 to sense the brightness of the environment, to modulate the brightness of the display module 6.

The above camera lens input port group 4, which further includes a front camera lens input port 42, which is used to connect to a front camera lens 421 to capture the image in front of the car.

The third embodiment of the in-car head-up display device of the present invention (as shown in FIG. 3, FIG. 4, FIG. 6), which may modulate the visual angle of the camera lens 411 according to the detected reverse signal and the signal indicating whether there is a moving car in rear of the car or not, includes:

a camera lens input port group 4, wherein at least three camera lens input ports 41 are set for connecting to three camera lens 411 respectively located on the rear, left and right sides of the car, to capture the images of surroundings in rear of the car;

a base 5, wherein a capacity space 51 is set inside for placing a circuit board 52, the circuit board 52 includes a panoramic display processor 53, the circuit board 52 is electrically connected to the camera lens input port group 4, the panoramic display processor 53 is used to join the images shot by the at least three camera lens together by using image processing techniques to form a three-dimensional panoramic image D, and a display opening 54 is set on the surface of the base 5;

a display module 6, which is electrically connected to the circuit board 52, and is set on the display opening 54 to receive the images output from the circuit board 52 to display the images as a mirror image;

a detection module 4, which includes a reverse signal unit and an image identification unit, is electrically connected to the circuit board 52, when the reverse signal unit detects a reverse signal and the image identification unit detects that there is a moving car in rear of the car, the visual angle of the camera lens 411 is modulated to a rear far angle; when the reverse signal unit detects a reverse signal and the image identification unit detects that there is no moving car in rear of the car, the visual angle of the camera lens 411 is modulated to a downwards angle of visibility;

a semitransparent reflective film 8, which is pasted on the inner side of the front windshield 9 of the car to display the image of the display module 6 as mirror images.

By the composition of the above elements, the three camera lens 411 set on the rear, left and right sides of the car are used to capture the images of surroundings in rear of the car. The images are transmitted to the panoramic display processor 53 through the camera lens input port group 4. After joining the images shot by the at least three camera lens together to form a three-dimensional panoramic image D by using image processing techniques by the panoramic display processor 53 of the circuit board 52, the display module 6 reflects the image on the semitransparent reflective film 8 by mirror image display method, the detection module 7 (which includes a reverse signal unit and an image identification unit) when detecting a reverse signal and the condition that a moving car in rear of the car, the visual angle of the camera lens 411 is modulated to a rear far angle (as shown in FIG. 4, the panoramic image D is a displayed image of a rear far angle); and when detecting a reverse signal and the condition there is no moving car in rear of the car, the visual angle of the camera lens is modulated to a downwards angle of visibility (as shown in FIG. 6, the panoramic image D is a displayed image of a downwards angle of visibility).

The above base 5, is placed on the instrument desk of the car, or embedded into the instrument desk under the front windshield 9.

The above display module 6, whose brightness achieved at least 2500 nit.

The above detection module 7, which further includes a light sensing unit, is electrically connected to the circuit board 52 to sense the brightness of the environment, to modulate the brightness of the display module 6.

The above camera lens input port group 4, which further includes a front camera lens input port 42, which is used to connect to a front camera lens 421 to capture the image in front of the car.

I claim:

1. A rearview panoramic head-up display device for vehicles, which includes:

a camera lens input port group, wherein at least three camera lens input ports are set for connecting to three camera lens respectively located on the rear, left and right sides of a car, to capture the images of surroundings in rear of the car;

a base, wherein a capacity space is set inside for placing a circuit board, the circuit board includes a panoramic display processor, the circuit board is electrically connected to the camera lens input port group, the panoramic display processor is used to join the images shot by the at least three camera lens together by using image processing techniques to form a three-dimensional panoramic image, and a display opening is set on the surface of the base;

a display module, which is electrically connected to the circuit board, and is set on the display opening to receive the images output from the circuit board to display the images as a mirror image;

a detection module, which is a light sensing unit, is electrically connected to the circuit board and is used to sense the brightness of the environment to modulate the brightness of the display module;

a semitransparent reflective film, which is pasted on the inner side of the front windshield of the car to display the image of the display module as mirror images; and a satellite module, which is electrically connected to the circuit board, the satellite module includes a satellite positioning and map data, and a control button, the control button modulating the visual angle of the camera lens to a modulated visual angel, and the modulated visual angle of the camera lens, a location and the vehicle traveling direction is stored with the satellite positioning and map data;

wherein, when the car is initially positioned in the location, the satellite positioning and map data and the modulated visual angel of the camera lens are stored, and when the car is subsequently positioned in the location, the camera lens are automatically adjusted to a corresponding modulated visual angle that was previously saved for the location.

2. The rearview panoramic head-up display device for vehicles as claimed in claim 1, wherein the base is placed on the instrument desk of the car, or embedded into the instrument desk under the front windshield.

3. The rearview panoramic head-up display device for vehicles as claimed in claim 1, wherein the brightness of the display module is achieved at least 2500 nit.

4. The rearview panoramic head-up display device for vehicles as claimed in claim 1, further includes a satellite module, which is electrically connected to the circuit board, the satellite module includes a satellite position information, a visual angle of the camera lens is modulated as a visual range when turning in an intersection.

5. A rearview panoramic head-up display device for vehicles, which includes:
  a camera lens input port group, wherein at least three camera lens input ports are set for connecting to three camera lens respectively located on the rear, left and right sides of the car, to capture the images of surroundings in rear of the car;
  a base, wherein a capacity space is set inside for placing a circuit board, the circuit board includes a panoramic display processor, the circuit board is electrically connected to the camera lens input port group, the panoramic display processor is used to join the images shot by the at least three camera lens together by using image processing techniques to form a three-dimensional panoramic image, and a display opening is set on the surface of the base;
  a display module, which is electrically connected to the circuit board, and is set on the display opening to receive the images output from the circuit board to display the images as a mirror image;
  a detection module, which includes a reverse signal unit and an image identification unit, is electrically connected to the circuit board, when the reverse signal unit detects a reverse signal and the image identification unit detects that there is a moving car in rear of the car, a visual angle of the camera lens is modulated to a wider visual angle and displayed as said panoramic image; when the reverse signal unit detects a reverse signal and the image identification unit detects that there is no moving car in rear of the car, the visual angle of the camera lens is modulated to a narrower visual angle and displayed as said panoramic image;
  a semitransparent reflective film, which is pasted on the inner side of the front windshield of the car to display the image of the display module as mirror images.

6. The rearview panoramic head-up display device for vehicles as claimed in claim 5, wherein the base is placed on the instrument desk of the car, or embedded into the instrument desk under the front windshield.

7. The rearview panoramic head-up display device for vehicles as claimed in claim 5, wherein the brightness of the display module is achieved at least 2500 nit.

8. The rearview panoramic head-up display device for vehicles as claimed in claim 5, wherein the detection module further includes a light sensing unit, which is electrically connected to the circuit board to modulate the brightness of the display module.

9. The rearview panoramic head-up display device for vehicles as claimed in claim 5, wherein the camera lens input port group further includes a front camera lens input port, which is used to connect to a front camera lens to capture the image in front of the car.

* * * * *